(12) United States Patent
Dichtl

(10) Patent No.: US 8,771,803 B2
(45) Date of Patent: Jul. 8, 2014

(54) METHOD OF APPLYING A MICROSTRUCTURE, MOULD AND ARTICLE WITH A MICROSTRUCTURE

(75) Inventor: Marius Dichtl, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 733 days.

(21) Appl. No.: 12/304,498

(22) PCT Filed: Jun. 13, 2007

(86) PCT No.: PCT/EP2007/005200
§ 371 (c)(1),
(2), (4) Date: Dec. 12, 2008

(87) PCT Pub. No.: WO2008/000350
PCT Pub. Date: Jan. 3, 2008

(65) Prior Publication Data
US 2009/0297805 A1     Dec. 3, 2009

(30) Foreign Application Priority Data
Jun. 27, 2006 (DE) .................. 10 2006 029 852

(51) Int. Cl.
C08J 7/04       (2006.01)
(52) U.S. Cl.
USPC ........... 427/510; 427/256; 427/288; 427/301; 427/356; 427/508
(58) Field of Classification Search
USPC ................ 427/510, 256, 288, 301, 356, 508
See application file for complete search history.

(56) References Cited

U.S. PATENT DOCUMENTS

| 5,712,731 A | 1/1998 | Drinkwater et al. |
| 5,752,442 A * | 5/1998 | Johnson et al. ............ 101/211 |

(Continued)

FOREIGN PATENT DOCUMENTS

| EP | 0238043 A2 | 9/1987 |
| EP | 0330733 A1 | 9/1989 |

(Continued)

OTHER PUBLICATIONS

International Search Report, International Application No. PCT/EP2007/005200, 4 pages, Sep. 20, 2007.

(Continued)

*Primary Examiner* — Robert S Walters, Jr.
(74) *Attorney, Agent, or Firm* — Lathrop & Gage LLP

(57) ABSTRACT

The present invention relates to a method for applying a colored or colorless micropattern to a support, in which
 a) a die form (40) is prepared whose surface exhibits an arrangement of elevations (42) and depressions (44) in the form of the desired micropattern,
 b) the depressions (44) in the die form are filled with a curable colored or colorless lacquer (26),
 c) the support (20, 30) is pretreated for a good anchoring of the colored or colorless lacquer (26),
 d) the surface of the die form (40) is brought into contact with the support (20, 30),
 e) the lacquer (26) that is in contact with the support (20, 30) in the depressions in the die form (40) is cured and, in the process, joined with the support (20, 30), and
 f) the surface of the die form (40) is removed from the support (20, 30) again such that the cured lacquer (26) that is joined with the support (20, 30) is pulled out of the depressions (44) in the die form (40).

22 Claims, 4 Drawing Sheets

(56) References Cited

U.S. PATENT DOCUMENTS

Figure 1:
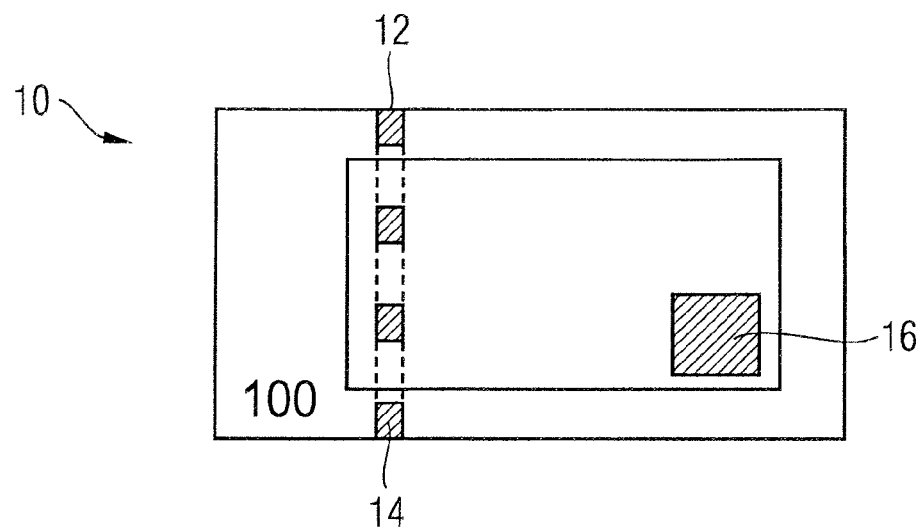

| | | | |
|---|---|---|---|
| 6,811,858 | B1 | 11/2004 | Mayer et al. |
| 7,667,894 | B2 | 2/2010 | Hoffmuller |
| 7,728,931 | B2 | 6/2010 | Hoffmuller |
| 7,808,605 | B2 | 10/2010 | Hoffmuller |
| 2005/0052750 | A1 | 3/2005 | King et al. |
| 2006/0181077 | A1* | 8/2006 | Kaule et al. ............ 283/72 |
| 2006/0255586 | A1* | 11/2006 | Lazzerini ............ 283/72 |
| 2007/0165182 | A1 | 7/2007 | Hoffmuller et al. |
| 2007/0211238 | A1 | 9/2007 | Hoffmuller |
| 2007/0216518 | A1 | 9/2007 | Hoffmuller |
| 2007/0229928 | A1 | 10/2007 | Hoffmuller et al. |
| 2007/0241553 | A1 | 10/2007 | Heim |
| 2007/0246933 | A1 | 10/2007 | Heim |
| 2007/0274559 | A1 | 11/2007 | Depta |
| 2008/0014378 | A1* | 1/2008 | Hoffmuller et al. ............ 428/29 |
| 2008/0054621 | A1 | 3/2008 | Burchard |
| 2008/0079257 | A1 | 4/2008 | Fessl |
| 2008/0088859 | A1 | 4/2008 | Depta |
| 2008/0160226 | A1 | 7/2008 | Kaule |
| 2008/0163994 | A1 | 7/2008 | Hoppe |
| 2008/0198468 | A1 | 8/2008 | Kaule |
| 2008/0216976 | A1 | 9/2008 | Ruck |
| 2008/0250954 | A1 | 10/2008 | Depta |
| 2008/0258456 | A1 | 10/2008 | Rahm |
| 2009/0001709 | A1 | 1/2009 | Kretschmar |
| 2009/0008923 | A1 | 1/2009 | Kaule |
| 2009/0008926 | A1 | 1/2009 | Depta |
| 2009/0102605 | A1 | 4/2009 | Kaule |
| 2009/0115185 | A1 | 5/2009 | Hoffmuller |
| 2009/0236061 | A1 | 9/2009 | Gruszczynski |
| 2009/0297805 | A1 | 12/2009 | Dichtl |
| 2009/0322071 | A1 | 12/2009 | Dichtl |

FOREIGN PATENT DOCUMENTS

| | | | | |
|---|---|---|---|---|
| EP | 0064067 B2 | | 3/2002 | |
| JP | 2-115083 | | 4/1990 | |
| JP | 7-28068 | | 1/1995 | |
| JP | 2005-36352 | | 2/2005 | |
| WO | WO 94/27254 | | 11/1994 | |
| WO | WO 00/20217 | | 4/2000 | |
| WO | WO 2005/052650 | | 6/2005 | |
| WO | WO 2005/106601 | * | 11/2005 | ............ G03H 1/00 |
| WO | WO 2005105473 | | 11/2005 | |
| WO | WO 2005105474 | | 11/2005 | |
| WO | WO 2005105475 | | 11/2005 | |
| WO | WO 2005108106 | | 11/2005 | |
| WO | WO 2005108108 | | 11/2005 | |
| WO | WO 2005108110 | | 11/2005 | |
| WO | WO 2006/005434 | * | 1/2006 | ............ B42D 15/00 |
| WO | WO 2006005434 | | 1/2006 | |
| WO | WO 2006015733 | | 2/2006 | |
| WO | WO 2006018171 | | 2/2006 | |
| WO | WO 2006018172 | | 2/2006 | |
| WO | WO 2006040069 | | 4/2006 | |
| WO | WO 2006056342 | | 6/2006 | |
| WO | WO 2006072380 | | 7/2006 | |
| WO | WO 2006087138 | | 8/2006 | |
| WO | WO 2006099971 | | 9/2006 | |
| WO | WO 2006119896 | | 11/2006 | |
| WO | WO 2006128607 | | 12/2006 | |
| WO | WO 2007006445 | | 1/2007 | |
| WO | WO 2007006455 | | 1/2007 | |
| WO | WO 2007076952 | | 7/2007 | |
| WO | WO 2007079851 | | 7/2007 | |
| WO | WO 2007115648 | | 10/2007 | |
| WO | WO 2008/000350 | | 1/2008 | |
| WO | WO 2008/000351 | | 1/2008 | |

OTHER PUBLICATIONS

International Preliminary Report on Patentability, International Application No. PCT/EP2007/005200, 7 pages, Jan. 22, 2009, English Translation.
U.S. Appl. No. 11/568,388, filed Oct. 26, 2006, Hoffmuller.
U.S. Appl. No. 11/568,535, filed Nov. 12, 2007, Depta.
U.S. Appl. No. 11/568,538, filed Sep. 23, 2008, Depta.
U.S. Appl. No. 11/571,923, filed Jan. 10, 2007, Hoffmuller.
U.S. Appl. No. 11/573,060, filed Feb. 1, 2007, Depta.
U.S. Appl. No. 11/573,484, filed Feb. 9, 2007, Heim.
U.S. Appl. No. 11/573,506, filed Feb. 9, 2007, Burchard.
U.S. Appl. No. 11/576,583, filed Apr. 3, 2007, Heim.
U.S. Appl. No. 11/719,843, filed Apr. 3, 2008, Kaule.
U.S. Appl. No. 11/813,077, filed Jun. 28, 2007, Hoppe.
U.S. Appl. No. 11/779,707, filed Jul. 18, 2007, Fessl.
U.S. Appl. No. 11/816,514, filed Aug. 16, 2007, Kaule.
U.S. Appl. No. 11/909,115, filed Sep. 19, 2007, Kretschmar.
U.S. Appl. No. 11/913,658, filed May 14, 2008, Ruck.
U.S. Appl. No. 11/915,965, filed Nov. 29, 2007, Depta.
U.S. Appl. No. 11/995,227, filed Jan. 10, 2008, Gruszczynski.
U.S. Appl. No. 11/995,228, filed Jan. 10, 2008, Kaule.
U.S. Appl. No. 12/097,668, filed Jun. 16, 2008, Rahm.
U.S. Appl. No. 12/097,834, filed Jun. 17, 2008, Kaule.
U.S. Appl. No. 12/294,222, filed Sep. 23, 2008, Hoffmuller.
U.S. Appl. No. 12/304,522, filed Dec. 12, 2008, Dichtl.

* cited by examiner

METHOD OF APPLYING A MICROSTRUCTURE, MOULD AND ARTICLE WITH A MICROSTRUCTURE

CROSS-REFERENCE TO RELATED APPLICATIONS

This application is the U.S. National Stage of International Application No. PCT/EP2007/005200, filed Jun. 13, 2007, which claims the benefit of German Patent Application DE 10 2006 029 852.7, filed Jun. 27, 2006; both of which are hereby incorporated by reference to the extent not inconsistent with the disclosure herewith.

The present invention relates to a method for applying a micropattern to a support, such as are used especially in the manufacture of security elements having micro-optical patterns, especially micro-optical moiré magnification arrangements. The present invention further relates to a die form for applying such a micropattern, and an object, especially a data carrier or a security element, having a micropattern produced in such a way.

For protection, data carriers, such as value or identification documents, but also other valuable articles, such as branded articles, are often provided with security elements that permit the authenticity of the data carrier to be verified, and that simultaneously serve as protection against unauthorized reproduction. The security elements can be developed, for example, in the form of a security thread embedded in a banknote, a cover foil for a banknote having a hole, an applied security strip or a self-supporting transfer element that, after its manufacture, is applied to a value document.

Here, security elements having optically variable elements that, at different viewing angles, convey to the viewer a different image impression play a special role, since these cannot be reproduced even with top-quality color copiers. For this, the security elements can be furnished with security features in the form of diffraction-optically effective micro- or nanostructures, such as with conventional embossed holograms or other hologram-like diffraction patterns, as are described, for example, in publications EP 0 330 733 A1 and EP 0 064 067 A1.

It is also known to use lens systems as security features. For example, in publication EP 0 238 043 A2 is described a security thread composed of a transparent material on whose surface a grating composed of multiple parallel cylindrical lenses is embossed. Here, the thickness of the security thread is chosen such that it corresponds approximately to the focal length of the cylindrical lenses. On the opposing surface, a print image is applied in perfect register, the print image being designed taking into account the optical properties of the cylindrical lenses. Due to the focusing effect of the cylindrical lenses and the position of the print image in the focal plane, depending on the viewing angle, different sub-areas of the print image are visible. In this way, through appropriate design of the print image, pieces of information can be introduced that are, however, visible only from certain viewing angles. Through the appropriate development of the print image, also "moving" images can be produced. However, when the document is turned about an axis that runs parallel to the cylindrical lenses, the motif moves only approximately continuously from one location on the security thread to another location.

Also micro-optical patterns such as blazed grating patterns, diffraction patterns, holograms, microlens patterns, Fresnel-lens-like patterns or so-called moiré magnification arrangements have for some time been in use as security features. Here, moiré magnification refers to a phenomenon that occurs when a grid composed of identically repeated image objects is viewed through a lens grid having approximately the same grid dimension. The moiré pattern created here constitutes a magnification and rotation of the image objects of the image grid.

If the grids are produced from image objects by means of conventional printing technology, then it is possible to manufacture image objects having line widths down to about 7 µm, such that the sizes of the printed image objects, for example letters or symbols, can measure down to about 70 µm. Due to the correlation between image object size and diameter and focal length of the lenses of the lens grid needed for viewing, the total thickness of moiré magnification arrangements produced in this way is at least 110 µm, so above the thickness of the value documents or banknotes commonly to be secured.

With other methods, for example by means of embossing technology, it is also possible to manufacture thinner moiré magnification arrangements having micropatterns as image objects. However, due to the technology, the smaller line width of the embossed micropatterns also results in a small pattern depth. The resulting differences in the lacquer layer thickness are generally not sufficient to manufacture strongly contrasting micropatterns. The optical appearance of such moiré magnification arrangements thus often does not satisfy the requirements of an impressive, easily perceptible security element. Furthermore, moiré magnification arrangements having multi-colored and thus visually particularly appealing and attention-grabbing micropatterns cannot be produced with any of the known manufacturing methods.

Based on that, the object of the present invention is to avoid the disadvantages of the background art and especially to specify, for applying a micropattern to a support, an improved method that can be used in the manufacture of micro-optical patterns, especially micro-optical moiré magnification arrangements. Upon suitable application of the micropatterns, the total thickness of the arrangement should be able to be so small that it can be introduced as a security element into, for example, value documents or banknotes. Alternatively or additionally, the optical appearance of the arrangements should be improved and a high-contrast and impressive visual impression produced. This object is solved by the method having the features of the main claim. A die form for applying a micropattern and an object having a micropattern produced in such a way are specified in the coordinated claims. Developments of the present invention are the subject of the dependent claims.

The present invention especially relates to a method for applying a colored or colorless micropattern to a support, in which
a) a die form is provided whose surface exhibits an arrangement of elevations and depressions in the form of the desired micropattern,
b) the depressions in the die form are filled with a curable colored or colorless lacquer,
c) the support is pretreated for a good anchoring of the colored or colorless lacquer,
d) the surface of the die form is brought into contact with the support,
e) the lacquer that is in contact with the support in the depressions in the die form is cured and, in the process, joined with the support, and
f) the surface of the die form is removed from the support again such that the cured lacquer that is joined with the support is pulled out of the depressions in the die form.

The surface of the die form can represent the desired micropattern positively or negatively, that is, the desired micropattern, such as a letter or symbol sequence, can be represented by depressions in an otherwise elevated surface or by elevations in an otherwise depressed surface. Since, upon application to the support, colored or colorless lacquer is transferred only from the depressions, both variants lead to a positive or negative representation of the same information content.

The depressions in the die form are preferably filled with a radiation-curing lacquer in step b) and the lacquer cured in step e) by impingement with radiation, especially by impingement with UV radiation. The radiation impingement can occur through the support, but also, for a UV transparent die form, through the die form.

The lacquer in the depressions in the die form can be precured prior to the bringing-into-contact in step d) in order to avoid mixing with other lacquer coatings, such as a backing layer applied to the support.

In an advantageous method variant, the support is pretreated in step c) in that a curable lacquer layer is applied to the support as a backing layer. The backing layer is then cured in step e) together with the lacquer in the depressions in the die form.

A radiation-curing lacquer layer is particularly advantageously applied as the backing layer. The radiation-curing backing layer can then be cured in step e), together with the lacquer in the depressions in the die form, by impingement with radiation, especially with UV radiation.

In addition to or instead of the lacquer in the depressions, also the backing layer can be precured prior to the bringing-into-contact in step d).

In another, likewise advantageous method variant, the support in step c) is pretreated in that an adhesive layer is applied to the support as a backing layer.

The pretreatment of the support in step c) can also occur through a pressure pretreatment. Such a pressure pretreatment can additionally be carried out for applying a backing layer to the support, since then a good anchoring of the backing layer is achieved. If particularly well pressure-pretreated support foils are used, the adhesion of the lacquer in the depressions to the support foil can already be sufficiently high, such that a separate backing layer can then be omitted.

In step b), any excess of colored or colorless lacquer is expediently removed by means of a doctor blade, dampening cylinder or the like.

The micropattern in the die form is preferably formed by micropattern elements having a line width between about 1 μm and about 10 μm and/or a pattern depth between about 1 μm and about 20 μm, preferably between about 1 μm and about 10 μm. Here, the method according to the present invention permits, for small line widths, the transfer of lacquer of large layer thickness such that, especially in the event that colored lacquers are used, it is possible to produce very high-contrast micropatterns.

The micropattern is preferably applied to a support that comprises a transparent plastic foil or a paper layer. The support especially exhibits a thickness between about 5 μm and about 50 μm, preferably between about 5 μm and about 25 μm.

The method according to the present invention can particularly advantageously be used in the manufacture of micro-optical patterns, especially micro-optical moiré magnification arrangements. However, it should be emphasized that the present invention is not limited to this application. Rather, the described method and the die form can advantageously also be used in the manufacture of other security elements, for example for the production of microtext prints on paper or foil.

If the above-described method is used for manufacturing a micro-optical moiré magnification arrangement, then preferably a motif image composed of a planar periodic or at least locally periodic arrangement of a plurality of micromotif elements is applied as the micropattern. Here, the lateral dimensions of the micromotif elements are advantageously between about 5 μm and about 50 μm, preferably between about 10 μm and about 35 μm. In addition, the opposing side of the support is expediently provided with a planar periodic or at least locally periodic arrangement of a plurality of microfocusing elements for the moiré-magnified viewing of the micromotif elements of the motif image.

In a preferred embodiment of the method according to the present invention, the micropattern is formed having micropattern elements, especially having micromotif elements having two or more different colors. In particular, the micropattern elements can be formed in sub-groups that, when viewed, each produce the impression of a mixed color. Such sub-groups can be formed, for example, by each of three micropattern elements of homogeneous form that are each applied in one primary color, for example red, green and blue. Due to the smallness of the micropattern elements, the individual colors are not resolvable for the viewer, but rather, he perceives a mixed color whose tone and saturation depend on the relative line widths and pattern depths of the three involved micropattern elements of the sub-groups.

The coloration of the micropattern elements can be caused by different soluble and pigment-containing dyes, with dyes being preferred that, for small line widths and layer thicknesses, produce high saturation values and contrasts. The pigment particle size of pigment colors is expediently coordinated with the line widths and layer thicknesses of the lacquer to be transferred.

In general, the backing layer in the corresponding embodiments is executed to be transparent in order to not affect the color impression of the micropattern elements. However, the backing layer can also be systematically colored in order to achieve particular colorations or color effects.

In addition to the elements mentioned, the support having the applied micropattern can be furnished with one or more functional layers for use as a security element for security papers, value documents and the like, with especially layers having visually and/or machine-perceptible security features, protective or coating layers, adhesive layers, heat seal features and the like being able to be used.

To protect against counterfeiting attacks and/or to facilitate further processing, the micropattern applied to the support is advantageously provided with a transparent overcoating.

The present invention also includes a die form for applying a colored or colorless micropattern to a support, especially according to a method of the kind described above. Here, the surface of the die form exhibits an arrangement of elevations and depressions in the form of the desired micropattern, and the micropattern in the die form is formed by micropattern elements having a line width between about 1 μm and about 10 μm and a pattern depth between about 1 μm and about 20 μm, preferably between about 1 μm and about 10 μm.

The surface of the die form is expediently provided with a nonstick coating, such as a CrN coating, to ensure easy demolding. Due to the strong mechanical stress when squeegeeing or wiping off the die, it is appropriate to harden the surface of the die form, for example through a coating with metallic chrome, TiN or so-called DLC (diamond-like carbon).

The die form is preferably developed to be cylinder shaped, and constitutes especially a tube for use with a clamping cylinder, or forms a part of an impression cylinder.

The present invention further comprises an object, especially a data carrier or a security element, having a colored or colorless micropattern produced in the manner described above. Here, the micropattern is preferably formed by micropattern elements having a line width between about 1 µm and about 10 µm and/or having a pattern depth between about 1 µm and about 20 µm, preferably between about 1 µm and about 10 µm. The micropattern itself is advantageously formed from a radiation-cured colorless or colored lacquer layer.

The micropattern is preferably applied on a pretreated support, the pretreatment being able to consist in the application of a backing layer composed of a curable lacquer layer or an adhesive layer, and/or in a pressure pretreatment of the support itself.

The support can especially comprise a transparent plastic foil or also a paper layer. Advantageously, the support exhibits a thickness between about 5 µm and about 50 µm, preferably between about 5 µm and about 25 µm.

According to a particularly preferred development, the object includes a micro-optical moiré magnification arrangement of the kind already described. For this, it is provided that the micropattern forms a motif image composed of a planar periodic or at least locally periodic arrangement of a plurality of micromotif elements, wherein the lateral dimensions of the micromotif elements are advantageously between about 5 µm and about 50 µm, preferably between about 10 µm and about 35 µm. Furthermore, a planar periodic or at least locally periodic arrangement of a plurality of microfocusing elements is expediently provided for the moiré-magnified viewing of the micromotif elements of the motif image. The lateral dimensions of the microfocusing elements are advantageously between about 5 µm and about 50 µm, preferably between about 10 µm and about 35 µm.

In a preferred embodiment of the present invention, the arrangement of micromotif elements and the arrangement of microfocusing elements each forms, at least locally, a two-dimensional Bravais lattice, the arrangement of micromotif elements and/or the arrangement of microfocusing elements preferably forming a Bravais lattice having the symmetry of a parallelogram lattice.

In these embodiments, the support advantageously forms an optical spacing layer for the motif image and the arrangement of the microfocusing elements. The microfocusing elements are preferably formed by non-cylindrical microlenses, especially by microlenses having a circular or polygonally delimited base area. It is appropriate to provide the arrangement of microfocusing elements with a protective layer whose refractive index preferably differs by at least 0.3 from the refractive index of the microfocusing elements.

The motif image having the micromotif elements and the arrangement of the microfocusing elements can, as described, be applied on opposing sides of the same support. But they can also each be produced on their own support foils that are merged only in a later method step.

In the objects having moiré magnification arrangements, but also in other objects according to the present invention, embodiments in which the micropattern is formed from micropattern elements, especially from micromotif elements having two or more different colors, have proven to be particularly advantageous. In particular, the micropattern elements can be formed in sub-groups that, when viewed, each produce the impression of a mixed color, as already explained elsewhere.

In general, the backing layer applied to the support is transparent in the corresponding embodiments in order to not affect the color impression of the micropattern elements.

However, the backing layer can also be systematically colored in order to achieve particular colorations or color effects. The micropattern can further be provided with a transparent overcoating to protect it against counterfeiting attacks, or to facilitate the further processing, for example the production of inverse lettering in applied metallic or color-shifting layers.

In a preferred embodiment, the object constitutes a security element, especially a security thread, a cover foil for a banknote having a hole, an applied security strip, a label or a self-supporting transfer element for application to a data carrier. For this, the security element can, for example, be furnished to be capable of heat sealing. The total thickness of the security element is expediently between about 20 µm and about 60 µm, preferably between about 30 µm and about 50 µm.

It is likewise preferred that the object is a data carrier, especially a banknote, a value document, a passport, an identification card or a certificate.

Furthermore, the object having the applied micropattern can be furnished with one or more functional layers, especially with layers having visually and/or machine-perceptible security features. Here, contiguous or partial-surface reflecting, high-index or color-shifting layers, for example, may be used, or also polarizing or phase-shifting layers, opaque or transparent conductive layers, soft- or hard-magnetic layers, or fluorescent or phosphorescent layers.

Further exemplary embodiments and advantages of the present invention are described below with reference to the drawings. To improve clarity, a depiction to scale and proportion was dispensed with in the drawings.

Figure 2:
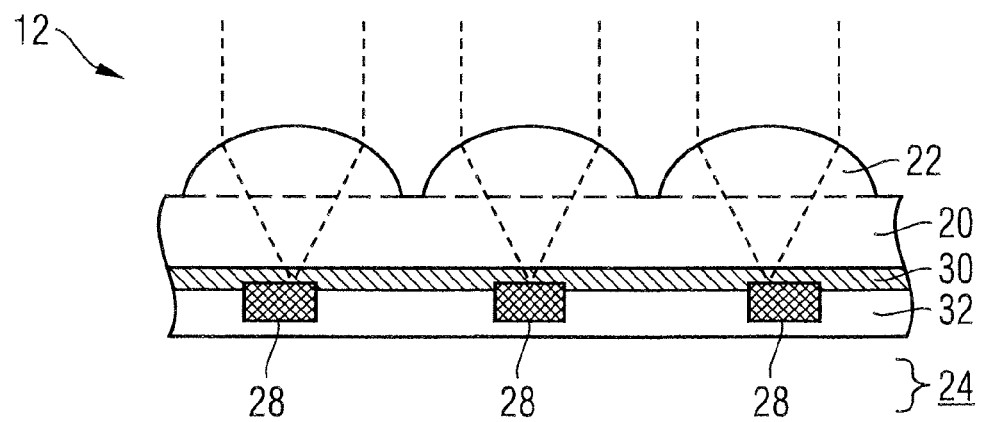
Figure 3:
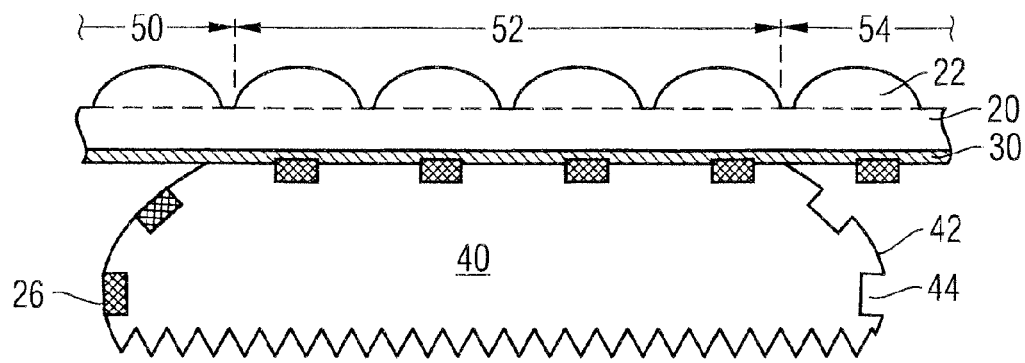
Figure 4A:
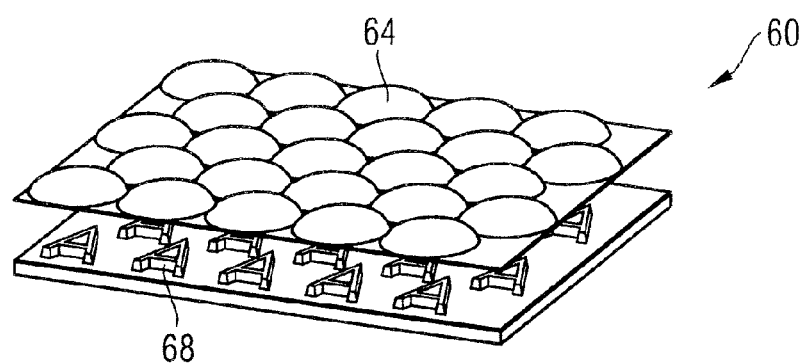
Figure 4B:
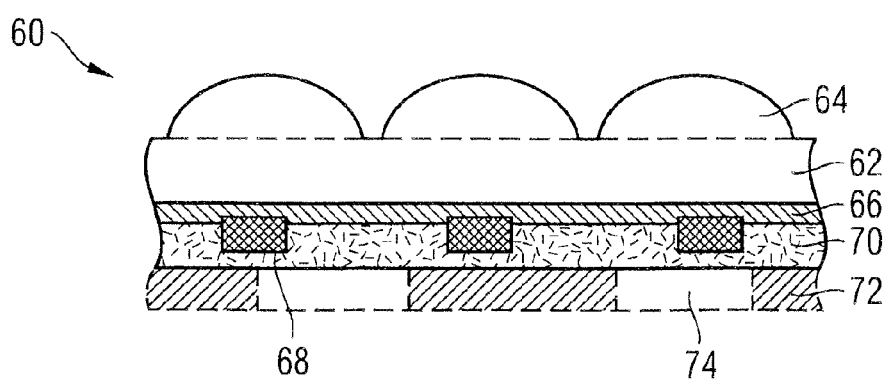
Figure 5A:
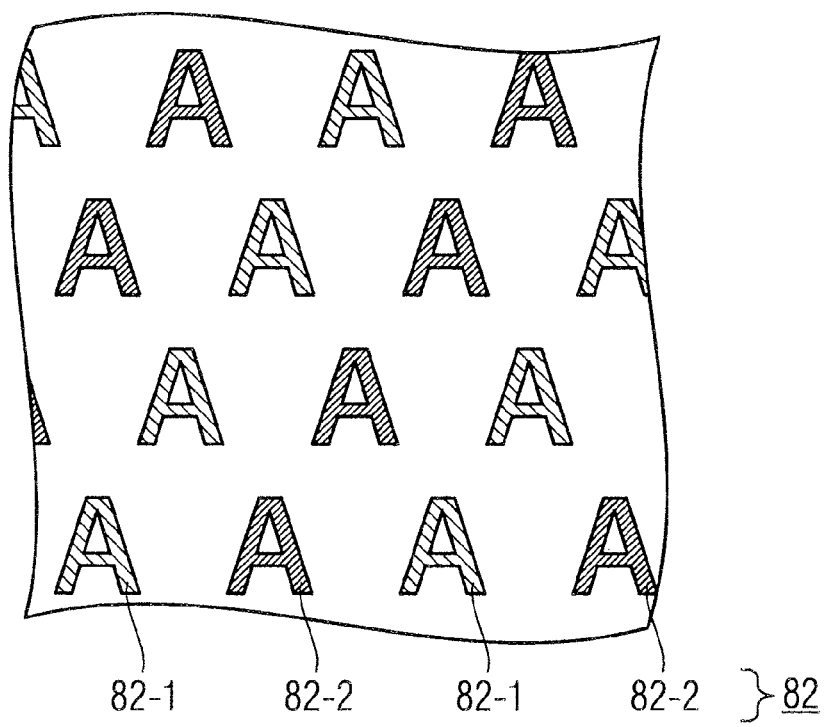
Figure 5B:
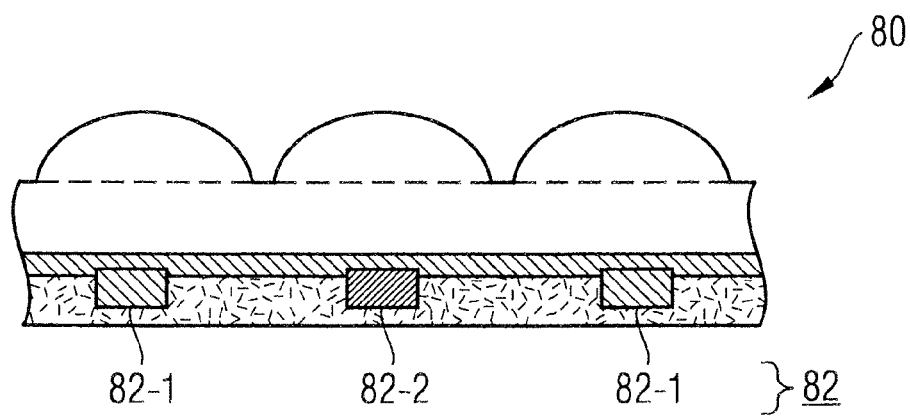
Figure 6A:
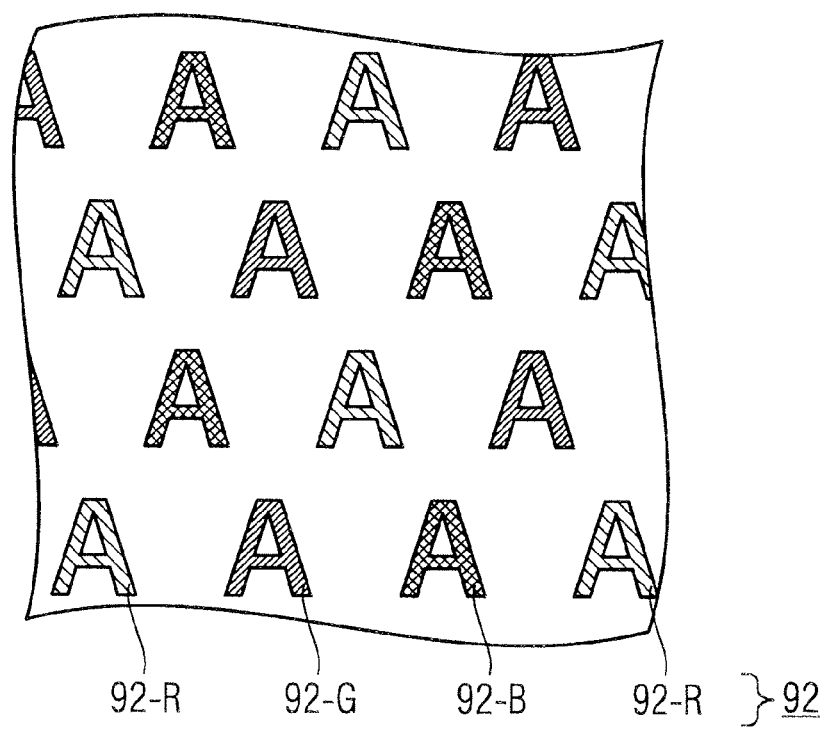
Figure 6B:
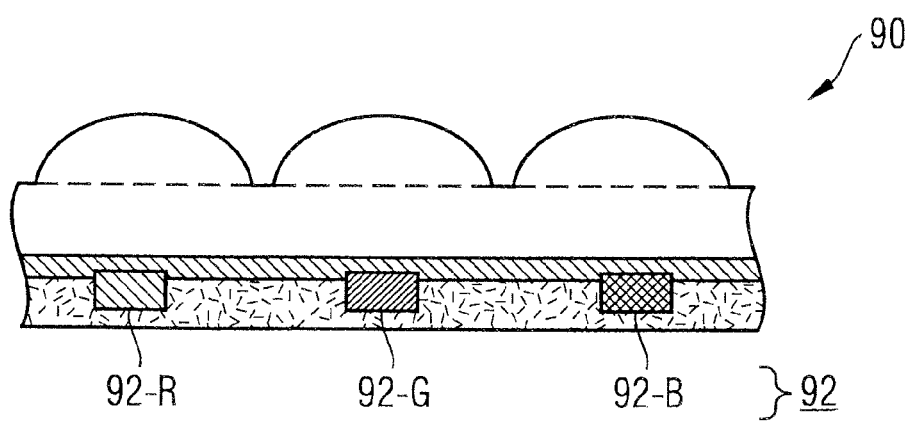

Shown are:

FIG. 1 a schematic diagram of a banknote having an embedded security thread and an affixed transfer element, FIG. 2 schematically, the layer structure of a security thread according to the present invention, in cross section, FIG. 3 a schematic diagram of the application of a micro-optical pattern, here a colored micropattern of a moiré magnification arrangement to a pretreated support with a die according to the present invention, FIG. 4 an inventive cover foil having a monochromatic motif image, with (*a*) showing a highly schematized perspective view from obliquely above and (*b*) showing a cross section through the security element, FIG. 5 an inventive security element having a multi-colored motif image, with (*a*) showing a schematic top view and (*b*) showing a cross section through the security element, and FIG. 6 an inventive security element having a motif image having mixed colors, with (*a*) showing a schematic top view and (*b*) showing a cross section through the security element.

The invention will now be explained using a security element for a banknote as an example. For this, FIG. 1 shows a schematic diagram of a banknote 10 that is provided with two security elements 12 and 16 according to exemplary embodiments of the present invention. The first security element constitutes a security thread 12 that emerges at certain window regions 14 on the surface of the banknote 10, while it is embedded in the interior of the banknote 10 in the areas lying therebetween. The second security element is formed by an affixed transfer element 16 of any shape. The security element 16 can also be developed in the form of a cover foil, a security strip, a transfer element or a label that is arranged over a window region or a through opening in the banknote.

Both the security thread 12 and the transfer element 16 can include micro-optical patterns, especially a moiré magnification arrangement having a micropattern composed of colored micromotif elements according to an exemplary embodiment of the present invention. The operating principle and the particular manufacturing method for such arrangements are described in greater detail in the following based on the security thread 12.

FIG. 2 schematically depicts the layer structure of the security element 12 in cross section. The security thread 12 includes a support 20 in the form of a transparent plastic foil, in the exemplary embodiment a PET foil about 20 µm thick. The top of the support foil 20 is provided with a grid-shaped arrangement of microlenses 22 that form, on the surface of the support foil, a two-dimensional Bravais lattice having a prechosen symmetry. For the sake of simpler illustration, in the following, a hexagonal lattice symmetry is assumed, even if the Bravais lattice according to the present invention can exhibit a lower symmetry and thus a more general shape.

The spacing of adjacent microlenses 22 is preferably chosen to be as small as possible in order to ensure as high an areal coverage as possible and thus a high-contrast depiction. The spherically or aspherically designed microlenses 22 exhibit a diameter between 5 µm and 50 µm, preferably merely between 10 µm and 35 µm, and are thus not perceptible with the naked eye.

On the bottom of the support foil 20, a motif layer 24 is arranged that includes a likewise grid-shaped arrangement of identical micromotif elements 28. Also the arrangement of the micromotif elements 28 forms a two-dimensional Bravais lattice having a prechosen symmetry, a hexagonal lattice symmetry again being assumed for illustration.

As indicated in FIG. 2 through the offset of the micromotif elements 28 with respect to the microlenses 22, the Bravais lattice of the micromotif elements 28 differs slightly in its symmetry and/or in the size of its lattice parameters from the Bravais lattice of the microlenses 22 to produce the desired moiré magnification effect. Here, the lattice period and the diameter of the micromotif elements 28 are on the same order of magnitude as those of the microlenses 22, so in the range from 5 µm to 50 µm, preferably from 10 µm to 35 µm, such that also the micromotif elements 28 are not perceptible with the naked eye.

The optical thickness of the support foil 20 and the focal length of the microlenses 22 are so coordinated with each other that the micromotif elements 28 are spaced approximately the lens focal length apart. Due to the slightly differing lattice parameters, the viewer sees, when viewing from above through the microlenses 22, a somewhat different sub-region of the micromotif elements 28 each time, such that the plurality of microlenses 22 produces, overall, a magnified image of the micromotif elements 28. Here, the resulting moiré magnification depends on the relative difference between the lattice parameters of the Bravais lattices used. If, for example, the grating periods of two hexagonal lattices differ by 1%, then a 100× moiré magnification results. For a more detailed description of the operating principle and advantageous arrangements of the micromotif elements and the microlenses, reference is made to the likewise pending German patent application 10 2005 062 132.5, whose disclosure in this regard is incorporated in the present application.

In such moiré magnification arrangements, the method according to the present invention is advantageously used to create motif images having colored micromotif elements and, in the process, to keep the total thickness of the moiré magnification arrangements so small that they can be introduced into value documents and banknotes as security elements. For this, the security thread 12 is provided, for example, with a heat seal feature 32. Alternatively or additionally, with the method according to the present invention, multi-colored motif images can be produced that permit even mixed color depictions, for example depictions in the RGB system.

Here, the production of the microlens grid on the support foil 20 can occur in the known manner by means of embossing, both thermoplastically moldable lacquers and UV-curing lacquers being able to be used. Presently, however, due to the possible better casting, the radiation-curing embossing of UV-curing lacquers is preferred. The embossing of UV-curing lacquers in the so-called casting mode, in which a precuring of the lacquer prior to the actual embossing process is entirely dispensed with, has proven to be particularly expedient. A pressure pretreatment of the support foil 20 lends itself to the best possible anchoring of the embossed microlens arrangement.

In further method steps that are particularly important for the present invention, an arrangement of micromotif elements 28 is applied contiguously or on parts of the side of the support foil 20 opposite the microlenses 22.

For this, the support foil 20 is pretreated in a preparation step, for example in that a backing layer 30 composed of transparent, UV curing lacquer is applied to the support foil 20. The use of a specially pressure-pretreated support foil lends itself to increasing the anchoring of the backing layer 30 to the support foil 20. This preparation step can be carried out prior to or also after the embossing of the microlens arrangement.

With reference to FIG. 3, to apply a micro-optical pattern, especially the colored micropattern, a die 40 is used whose surface exhibits an arrangement of elevations 42 and depressions 44 in the form of the desired micropattern. As becomes clear from the following depiction, the micro-optical elements, here the micropattern elements, can be developed both as depressions and as elevations in the die 40. For the depicted manufacturing of colored micropattern elements of a moiré magnification arrangement, in the first case are obtained colored micropattern elements in transparent surroundings on the support, and in the latter case, transparent micropattern elements in colored surroundings. In both cases, the information content of the applied micropattern is identical.

The depressions 44 of the die 40 are first filled with a UV-curable colorless or colored lacquer 26, and any lacquer excess removed by means of a doctor blade, dampening cylinder or other suitable technical aid.

Thereafter, the filled section of the die 40 is introduced to the pretreated side of the support foil 20 (region 50) and brought into direct contact. In contact (region 52), the lacquer material 26 in the depressions in the die 40 and the associated section of the backing layer 30 are cured by UV irradiation, a firm connection between the colorless and colored lacquer 26 in the depressions and the transparent lacquer of the backing layer 30 being created by polymerization.

To suppress a mixing of the lacquer portions in the depressions in the die 40 and the backing layer 30 in contact prior to curing, and thus improve the optical appearance of the finished arrangement, it can be expedient to conduct a slight precuring of the colored lacquer 26 in the die 40 and/or the backing layer 30 on the support foil 20.

Lastly, the surface of the die 40 is removed from the support foil 20 (region 54) again, the cured lacquer 26 that is now joined with the support foil 20 via the backing layer 30 being pulled out of the depressions 44 in the die form. Since the composite composed of cured lacquer from the depressions in the die 40 and the backing layer 30 acts, mechanically, like a contiguous coating, the pulling out of the colorless or colored lacquer portions 26 from the die 40 at demolding is positively supported.

A particular advantage of curing in the die form in the region 52 lies in the fact that large layer thicknesses of colorless and colored lacquers can be transferred, such that very high-contrast depictions can be achieved when colored lacquers are used. Furthermore, the method permits the manufacture of very fine micropatterns with very high resolution, as are desired, for example, for moiré magnification arrangements, without the applied patterns losing any great detail after demolding.

To ensure easier demolding in the region 54, the surface of the die 40 can be provided with a nonstick coating, for example a CrN layer.

Due to the strong mechanical stress on the surface of the die 40 due to squeegeeing or wiping off, curing the surface of the die lends itself to ensuring long utilization times.

Such a curing can occur, for example, through a coating of the die surface with metallic chrome, TiN or so-called DLC (diamond-like carbon).

The die 40 can be used in different variants. In a first variant, the manufacture of the die 40 occurs similarly to a conventional embossing sleeve. Here, the production of the original die occurs with semiconductor technology methods, for example with photolithography, electron beam lithography, laser-direct writing or laser ablation. If appropriate, a suitable step-and-repeat recombination occurs with the original.

After a galvanic casting, trimming and welding, additional nonstick, curing or other functional layers can then be applied if desired for the relevant application. The finished die can then be used on a clamping cylinder, such as a conventional embossing sleeve.

In the second variant, the die 40 is manufactured like a conventional impression cylinder. Here, the production occurs with the known methods of impression cylinder production, especially with laser exposure, etching or laser ablation, the particularly high requirements in terms of resolving power and positioning tolerances naturally being taken into account. Following any application of additional nonstick, curing or other functional layers, the finished die is used like an impression cylinder.

Even if the use of the die 40 in connection with the application of the micromotif element arrangement has been described in greater detail, of course also the microlenses 22 of a moiré magnification arrangement or other micro-optical patterns, for example, blazed grating patterns, DOEs or CGHs, microlens patterns and Fresnel-lens-like patterns, can be applied to the support foil 20 with the aid of such a die.

The work steps of the application of the microlens arrangement and the micromotif elements can be carried out in any sequence. Also a simultaneous execution, so the simultaneous application of the two arrangements on opposing sides of the support foil, is possible.

Micromotif elements 28 having different colors can be produced in multiple operations with multiple dies 40 that are each filled with differently colored lacquer 26. The micromotif elements need not all be present in the same layer, it is also possible to realize multilayer designs. If multiple arrangements of micromotif elements are produced in different colors in this way, in general, the different arrangements need not be brought into register with each other since, for the moiré effect, the relative orientation of the microlens arrangement and the respective micromotif element arrangement is decisive. However, depending on the application case, also a precise registration of the micromotif element arrangements with each other can be advantageous.

FIG. 4 shows a security element having a monochromatic motif image that is manufactured according to the present invention and that can be developed in the form of a security thread or, as in the exemplary embodiment, in the form of a cover foil 60 for a banknote having a hole. Here, FIG. 4(*a*) shows a highly schematized perspective view from obliquely above, and FIG. 4(*b*) a cross section through the security element.

The cover foil 60 exhibits, as the support, a transparent PET foil 62 of a thickness of about 10 µm to 30 µm. On a first surface of the PET foil 62, a periodic arrangement of microlenses 64 is applied by means of embossing a UV-curing lacquer. The opposing surface of the foil 62 was, as described above, first provided with a backing layer 66 composed of UV-curing lacquer, and a motif image composed of colored micromotif elements 68 then applied to the surface pretreated in this way. In FIG. 4(*a*), for illustration, the micromotif elements 68 are depicted only as simple letter "A's".

The arrangement of the micromotif elements 68 is embedded in a transparent overcoating 70 and thus protected against counterfeiting attacks. If further opaque functional layers are omitted, then upon application of the cover foil 60 in register with the banknote paper, a moiré magnification effect that is observable in transmission is created in the finished banknote.

If desired, additional functional layers can be applied, for example, a metallic or color-shifting coating 72, depicted as a dotted line in FIG. 4(*b*), that includes negative image elements in the form of non-coated sub-regions 74. Through the overcoating 70, such coatings having gaps can easily be produced with a washing method, as is known, for example, from publication WO 99/13157 A1, since the overcoating 70 compensates the local roughness that is strongly increased by the applied micromotif elements 68.

The security element 80 according to a further exemplary embodiment of the present invention, shown in FIG. 5, exhibits a multi-colored motif image. Also the security element 80 can be a security thread or a cover foil for banknotes.

The arrangement of micromotif elements 82 depicted in top view in FIG. 5(*a*) includes different colored micromotif elements 82-1 and 82-2, again depicted in the figure merely by the letter "A". It is possible to produce the different colors, for example, with the aid of two dies 40 that are each filled with differently colored lacquer. Variations in the pattern depth and the line width of the micromotif elements 82-1, 82-2 facilitate numerous variations in saturation and contrast such that there is further freedom of design for the designer.

FIGS. 6(*a*) and 6(*b*) show a further embodiment of an inventive security element 90 that exhibits a motif image having mixed colors. In the exemplary embodiment, adjacent micromotif elements 92-R, 92-G, 92-B are each applied with red, green or blue lacquer with certain pattern depths and line widths. Due to the small dimensions of the micromotif elements 92 (for example about 35 µm), the individual colors cannot be resolved upon viewing, but rather the viewer perceives a mixed color. Here, through suitable choice of the pattern depths and line widths of the micromotif elements 92-R, 92-G, 92-B, the entire color triangle between the primary colors used, for example, red, green and blue, can be accessed.

The embodiment of motif images having mixed colors also facilitates novel moiré magnification effects. If, for example, different mixed colors are manufactured in different regions of a security element through suitable dies, then moiré magnification arrangements having color blends, color-shift effects or color contrast variations can be manufactured.

For example, a sub-region of a security element can be provided only with red micromotif elements 92-R, and another sub-region only with green micromotif elements 92-G. Between the two sub-regions, the pattern depth of the red micromotif elements 92-R can drop from its maximum value to zero, while the pattern depth of the green micromotif elements 92-G simultaneously increases from zero to its maximum value such that, between the two sub-regions, a continuous color blend from red to green is created.

It is understood that also the security elements in FIGS. 5 and 6 can be provided with additional functional layers, as already described in connection with FIG. 4.

The invention claimed is:

1. A method for applying a colored or colorless micropattern to a support, comprising the steps wherein
    a) a die form is provided whose surface exhibits an arrangement of elevations and depressions in the form of the desired micropattern,
    b) the depressions in the die form are filled with a curable colored or colorless lacquer,
    c) the support is pretreated for an anchoring of the colored or colorless lacquer,
    d) in each case, the filled section of the die form is introduced to the pretreated support and brought into contact with the support,
    e) the lacquer that is in contact with the support in the depressions in the die form is cured and, in the process, joined with the support, and
    f) the surface of the die form is removed from the support again such that the cured lacquer that is joined with the support is pulled out of the depressions in the die form;
    wherein the support comprises a transparent plastic foil or a paper layer; and
    wherein the micropattern is for use in a micro-optical moiré magnification arrangement, characterized in that the micropattern in the die form is formed by micropattern elements having a line width between about 1 μm and about 10 μm.

2. The method according to claim 1, characterized in that the depressions in the die form in step b) are filled with a radiation-curing lacquer and the lacquer cured in step e) by impingement with radiation.

3. The method according to claim 2, wherein the radiation is UV radiation.

4. The method according to claim 1, characterized in that the lacquer in the depressions in the die form is precured prior to the bringing-into-contact in step d).

5. The method according to claim 1, characterized in that, in step c), the support is pretreated in that a curable lacquer layer is applied to the support as a backing layer and, in step e), the backing layer is cured together with the lacquer in the depressions in the die form.

6. The method according to claim 5, characterized in that the backing layer is precured prior to the bringing-into-contact in step d).

7. The method according to claim 5, wherein the backing layer is colored.

8. The method according to claim 1, characterized in that a radiation-curing lacquer layer is applied as a backing layer and, in step e), the backing layer is cured together with the lacquer in the depressions in the die form by impingement with radiation.

9. The method according to claim 8, wherein the radiation is UV radiation.

10. The method according to claim 1, characterized in that the support in step c) is pretreated in that an adhesive layer is applied to the support as a backing layer.

11. The method according to claim 1, further comprising the step of applying a backing layer to the support.

12. The method according to claim 1, characterized in that any excess of colored or colorless lacquer in step b) is removed by a doctor blade or dampening cylinder.

13. The method according to claim 1, characterized in that the micropattern in the die form is formed by micropattern elements having a pattern depth between about 1 μm and about 20 μm.

14. The method according to claim 1, characterized in that the micropattern is applied to the support having a thickness between about 5 μm and about 50 μm.

15. The method according to claim 1, characterized in that, as the micropattern, a motif image composed of a planar periodic or at least locally periodic arrangement of a plurality of micromotif elements is applied.

16. The method according to claim 15, characterized in that the lateral dimensions of the micromotif elements are between about 5 μm and about 50 μm.

17. The method according to claim 15, characterized in that the opposing side of the support is provided with a planar periodic or at least locally periodic arrangement of a plurality of microfocusing elements for the moiré-magnified viewing of the micromotif elements of the motif image.

18. The method according to claim 1, characterized in that the micropattern elements are formed in sub-groups that, when viewed, each produce the impression of a mixed color.

19. The method according to claim 1, characterized in that the support having the applied micropattern is furnished with one or more functional layers for use as a security element for security papers or value documents.

20. The method according to claim 1, characterized in that the micropattern applied to the support is provided with a transparent overcoating.

21. The method according to claim 1, characterized in that the support having the applied micropattern is furnished to be capable of heat sealing.

22. The method according to claim 1, wherein the micropattern is formed having micromotif elements having two or more different colors.

* * * * *